A. B. DAUGER.
HOUSING MACHINE FOR WOODWORKING.
APPLICATION FILED DEC. 7, 1916.
1,306,252.
Patented June 10, 1919.
8 SHEETS—SHEET 1.
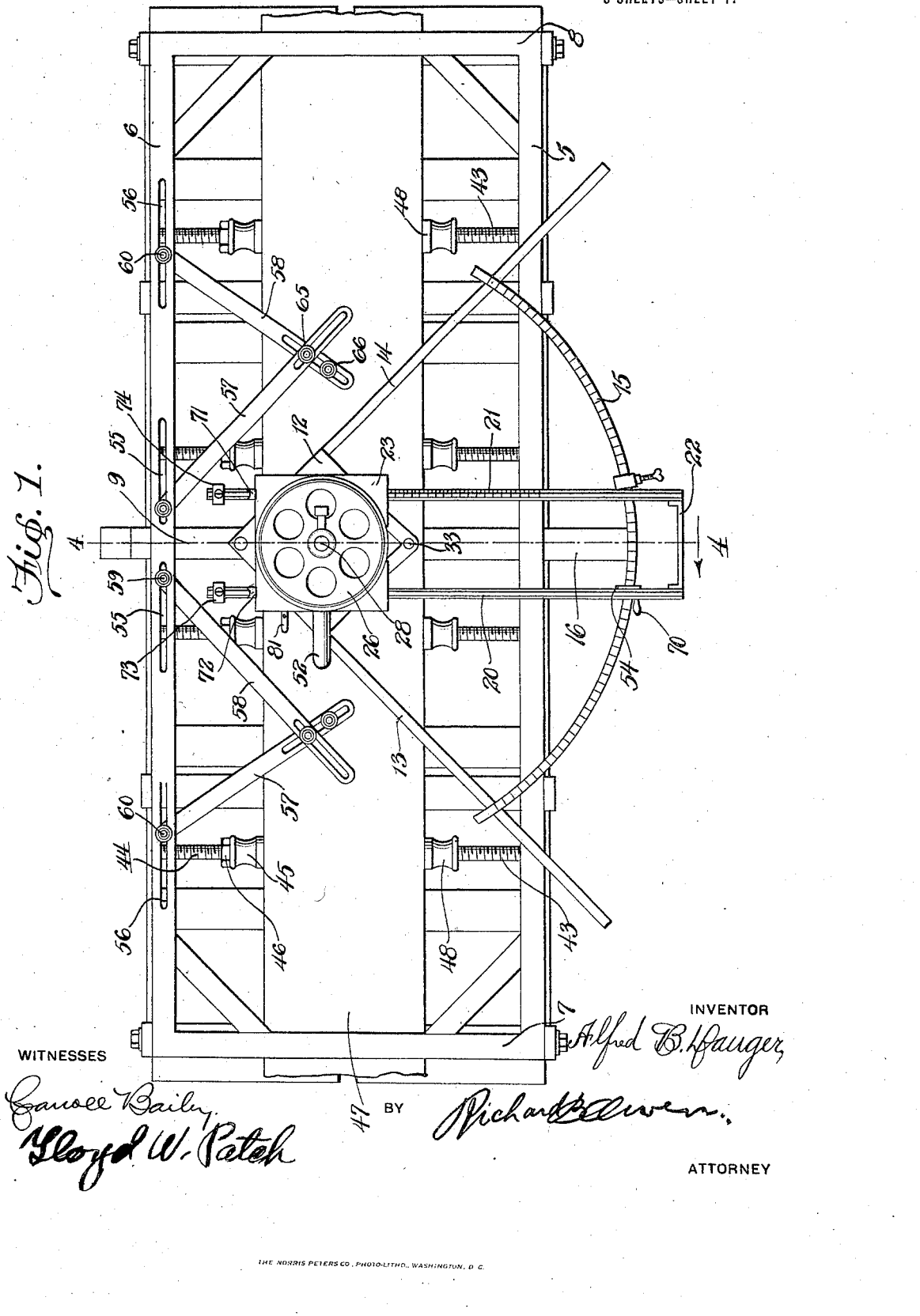
WITNESSES
INVENTOR
Alfred B. Dauger,
BY
Richard Bowen.
ATTORNEY

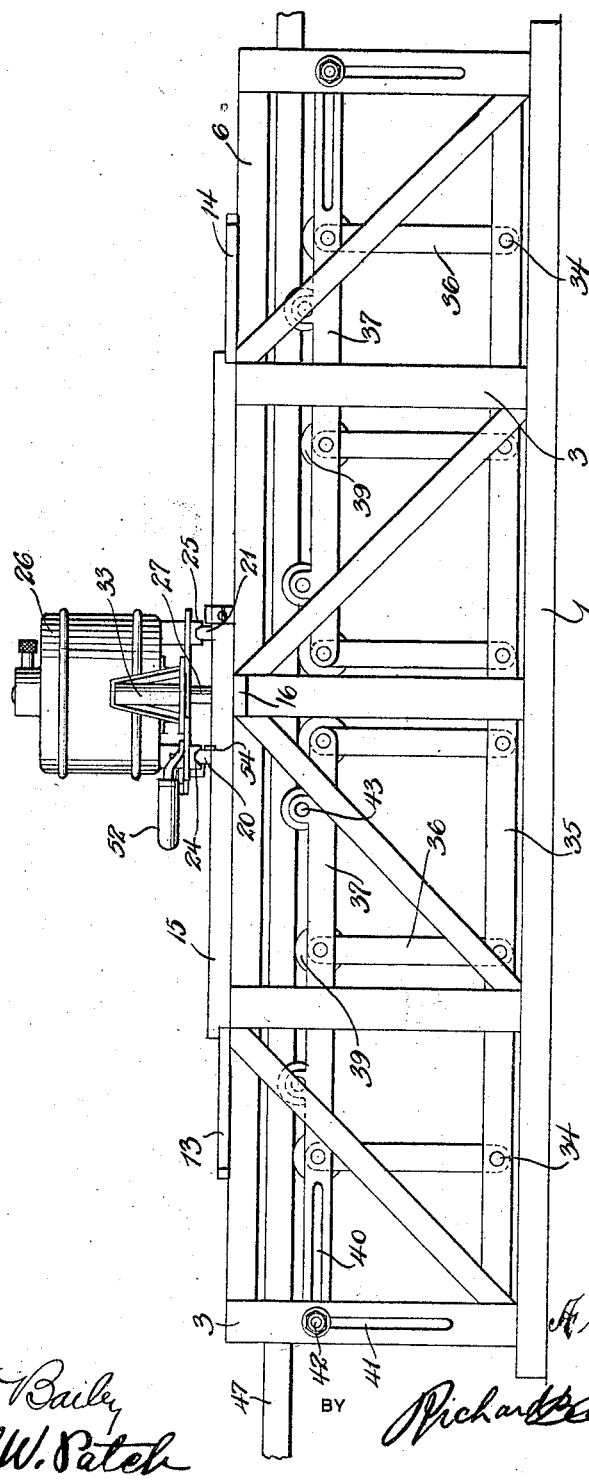

A. B. DAUGER.
HOUSING MACHINE FOR WOODWORKING.
APPLICATION FILED DEC. 7, 1916.
1,306,252.
Patented June 10, 1919.
8 SHEETS—SHEET 3.
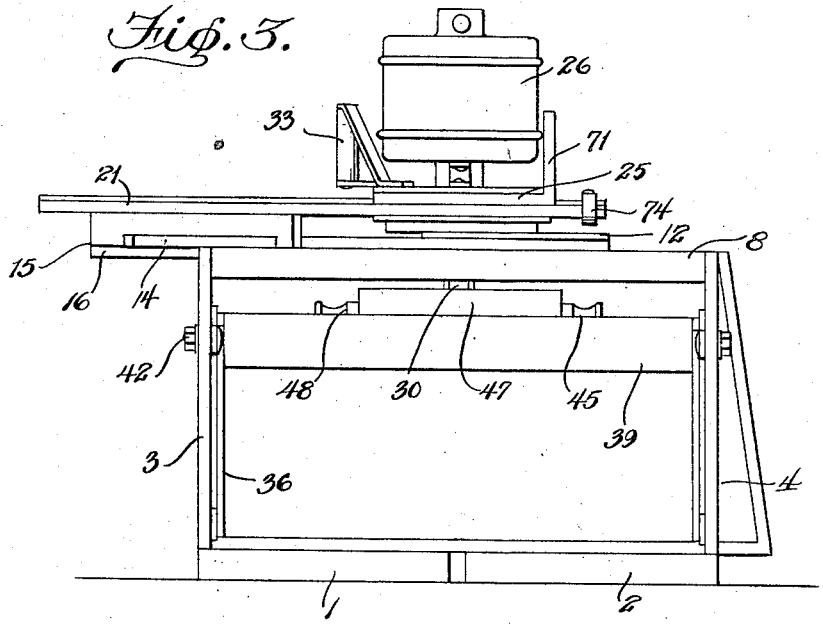
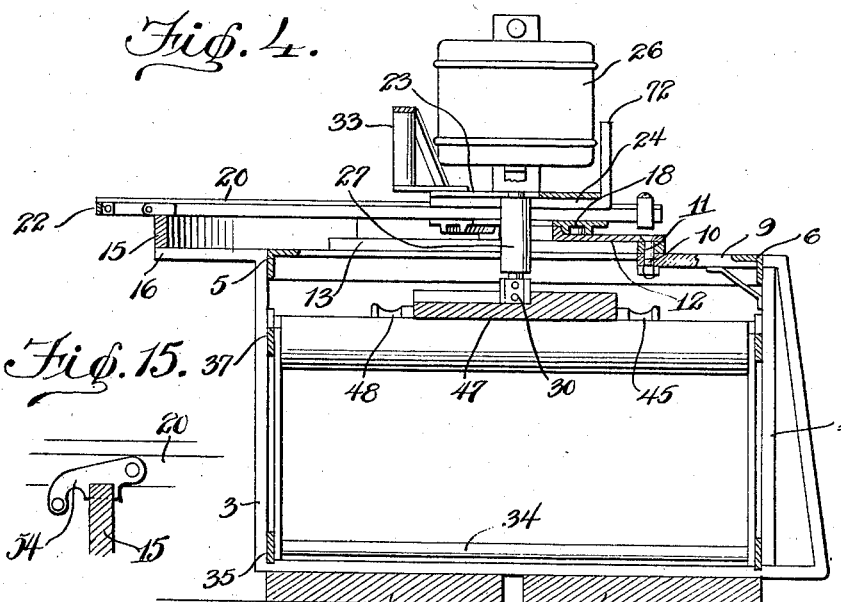
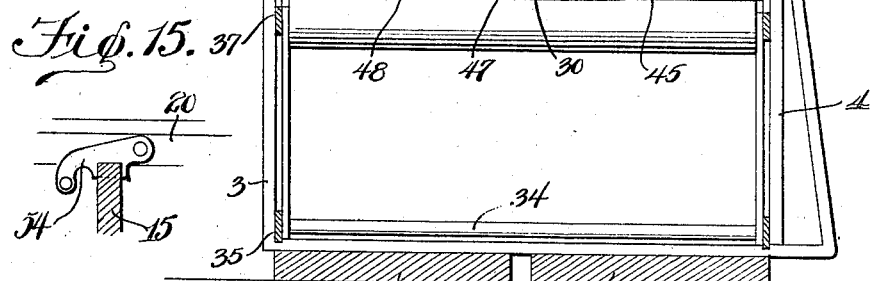
WITNESSES
INVENTOR
Alfred B. Dauger,
BY Richard Owen.
ATTORNEY

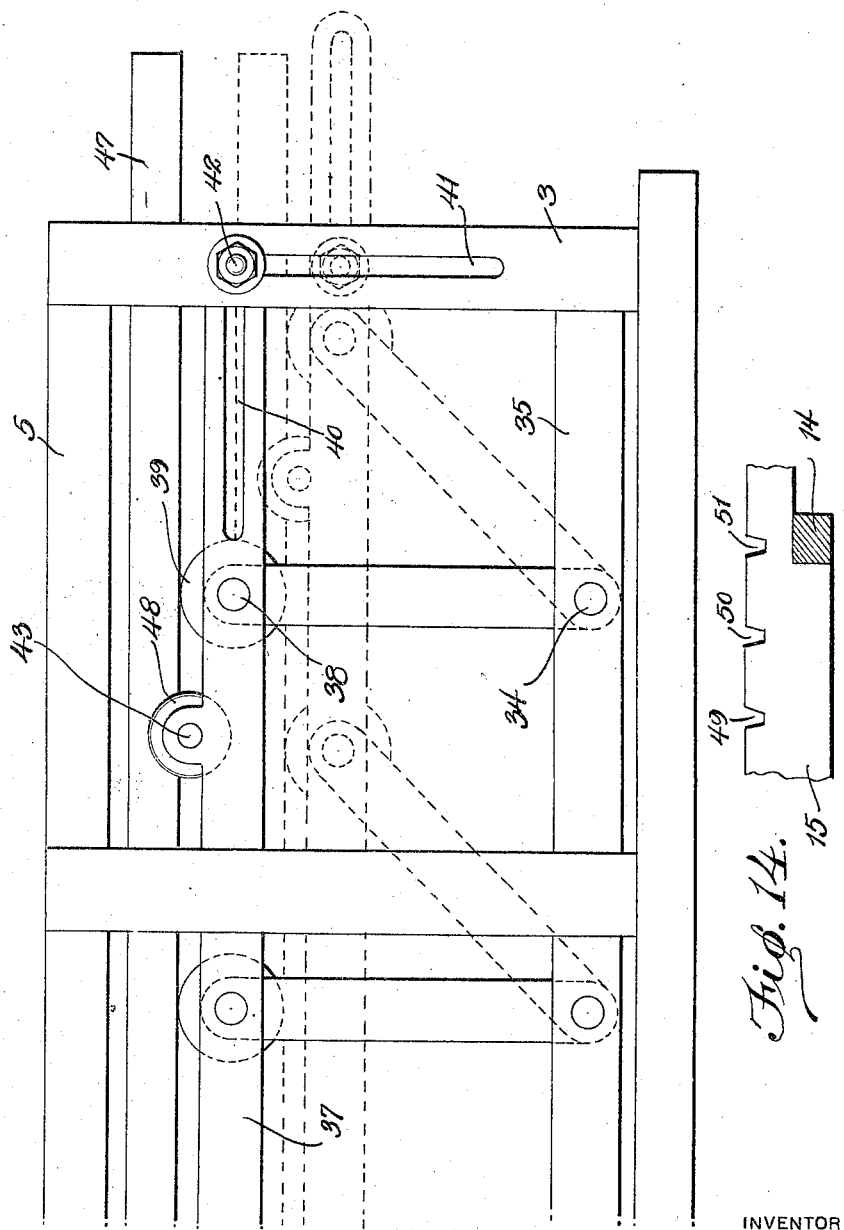

A. B. DAUGER.
HOUSING MACHINE FOR WOODWORKING.
APPLICATION FILED DEC. 7, 1916.
1,306,252. Patented June 10, 1919.
8 SHEETS—SHEET 5.
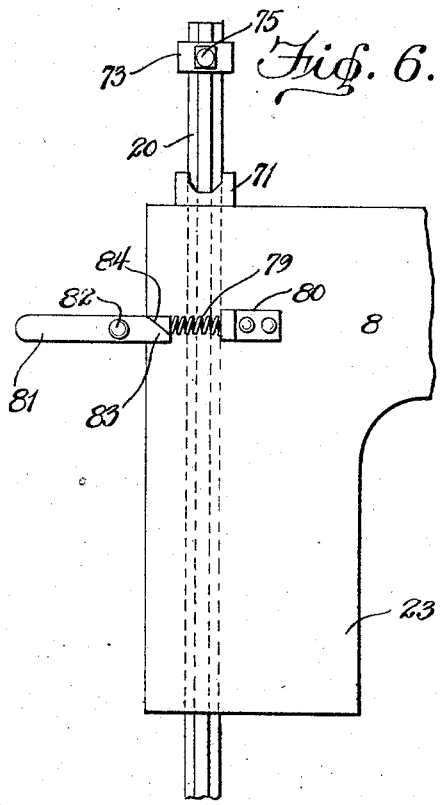
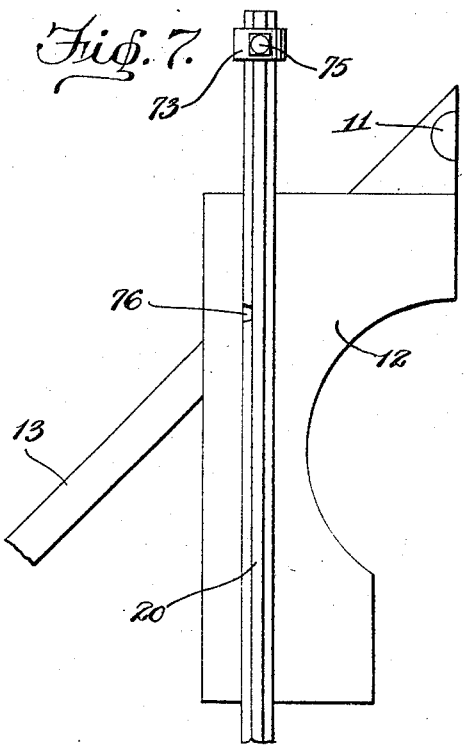
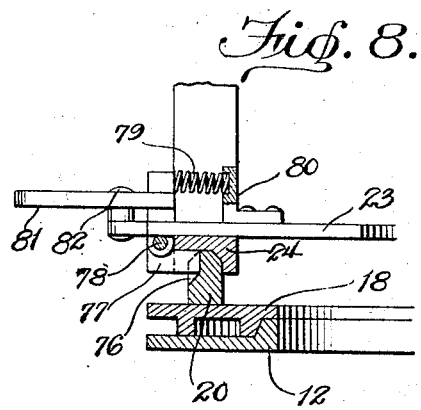
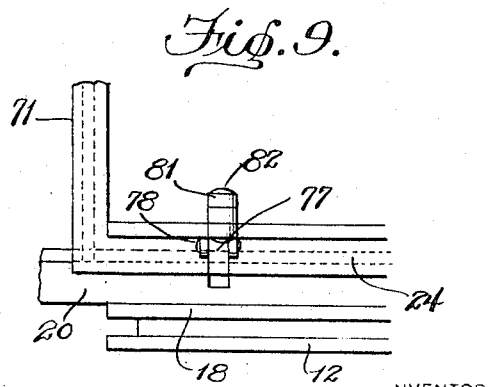
WITNESSES
INVENTOR
Alfred B. Dauger,
BY Richard B. Owen.
ATTORNEY

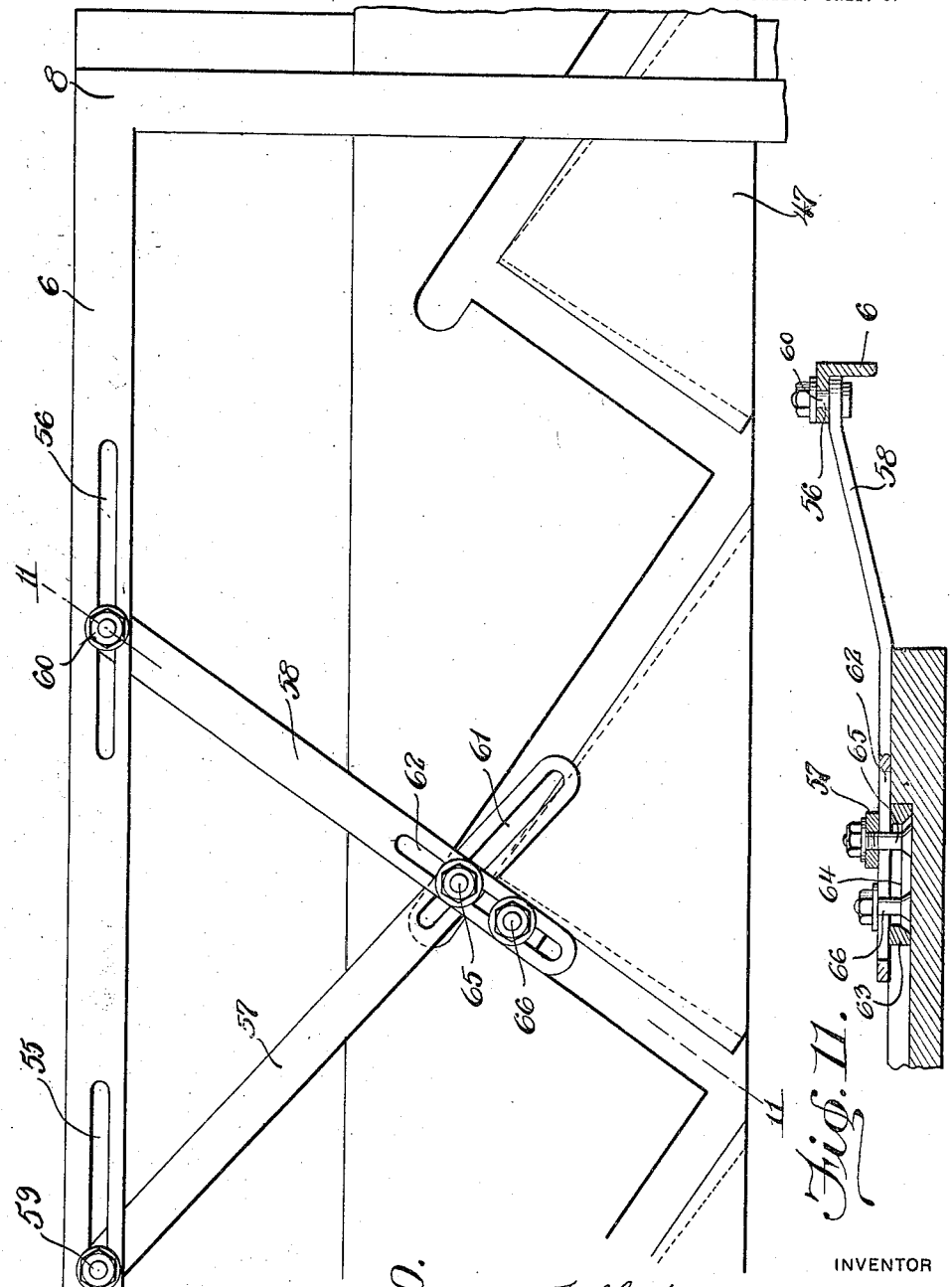

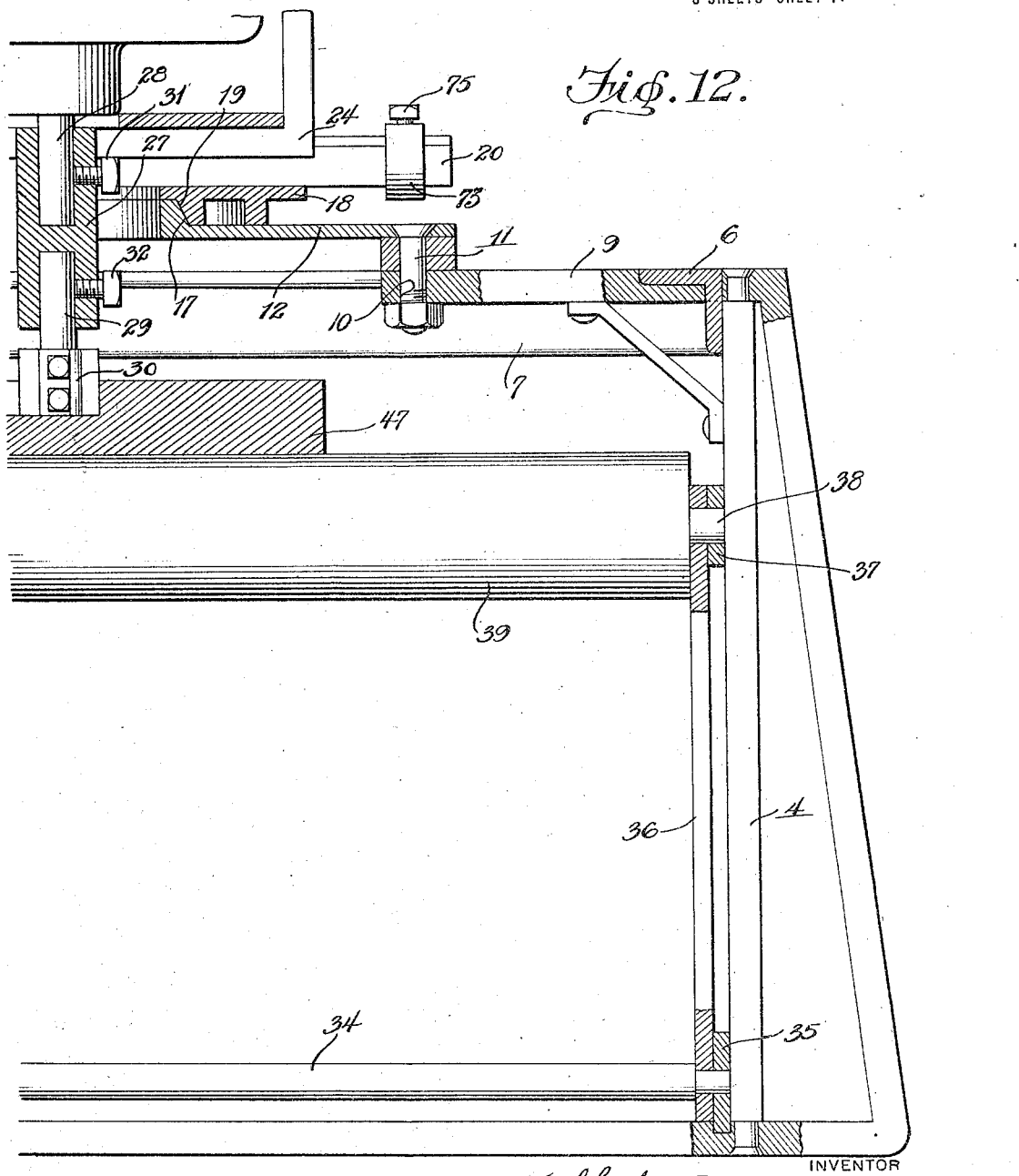

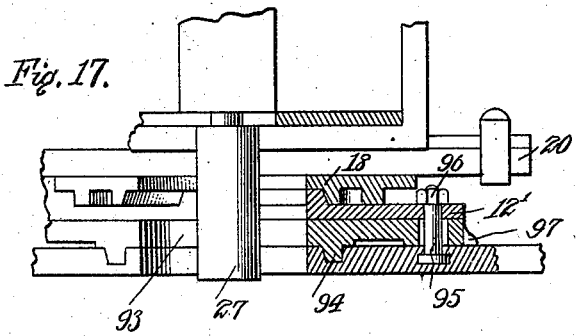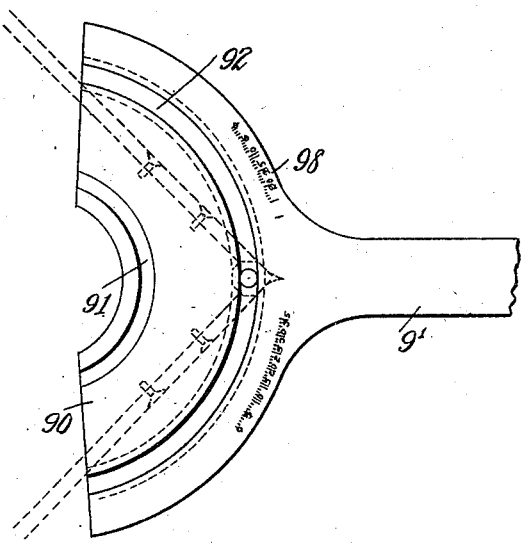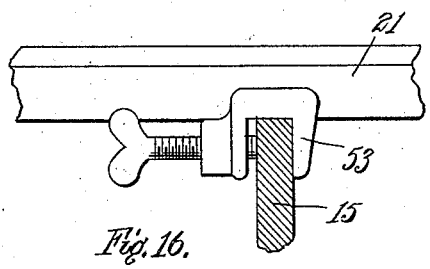

UNITED STATES PATENT OFFICE.

ALFRED B. DAUGER, OF SACRAMENTO, CALIFORNIA.

HOUSING-MACHINE FOR WOODWORKING.

1,306,252.

Specification of Letters Patent.

Patented June 10, 1919.

Application filed December 7, 1916. Serial No. 135,667.

*To all whom it may concern:*

Be it known that I, ALFRED B. DAUGER, a citizen of the United States, residing at Sacramento, in the county of Sacramento and State of California, have invented certain new and useful Improvements in Housing-Machines for Woodworking, of which the following is a specification.

An object of my invention is to provide a machine which is so constructed that it may be used in housing or cutting out the rabbets in the stringers or side pieces of stairs and newel posts, and which may also be used for inlay, dadoing, fret work, dove-tailing, and in fact any other work which requires the cutting or stringing of a rabbet or groove across the face of a board or other piece of lumber, and which has the parts so arranged that the piece of lumber is held adjusted to have the machine operate at the desired point thereon, the holding means being arranged to permit adjustment of the relative height at which the lumber is held so that the depth of cut may be regulated.

A further object is to so construct the supporting and operating parts of the machine that the cutting guides by which the course of travel of the router is directed may be adjusted to cut the rabbets in the desired angular disposition with respect to the longitudinal extent of the lumber and to so arrange the parts that when the machine is being used in rabbeting the stringers or side pieces for use in stairs, which rabbets are to receive the treads and risers, when the rabbets forming one set of treads and risers has been completed, guide means may be set and the remaining right angularly disposed rabbets along the length of the stringer may be located at the proper point without the necessity of resorting to further measures, and also when so desired the rabbets may be tapered to permit the insertion of wedges to hold the treads and risers rigidly in place.

A still further object is to provide means working in conjunction with the guide track by which the travel of the router is directed, which means is so arranged that the router may be given sufficient forward movement to cut the rabbets to the extreme position occupied by the nose of the tread and which means will stop return movement of the router when the desired position for the cut of the riser has been reached, the parts being so arranged that the guideways may then be shifted to direct the course of travel of the router in its angular cut from the tread rabbet to form the rabbet for the riser, this arrangement of the parts making it possible to use the machine cutting both into and out of the stops and also insuring that the same length of nose will be left for each of the treads and that the risers will be positioned at the proper points.

With the above and other objects in view, my invention consists in certain novel features of construction and combinations of parts which will be hereinafter set forth in connection with the drawings and then more particularly pointed out in the claims.

In the drawings:—

Figure 1 is a view in top plan of the machine with a length of lumber mounted in a relation to be operated upon.

Fig. 2 is a view in front elevation of the machine.

Fig. 3 is a view from one end of the structure.

Fig. 4 is a transverse vertical sectional view taken on the line 4—4 of Fig. 1 and looking in the direction indicated by the arrow.

Fig. 5 is an enlarged detail view of a portion of the supporting frame and the lumber carrying and supporting means.

Fig. 6 is a top plan view of the motor and router carriage.

Fig. 7 is a view similar to Fig. 6 showing the track carrying turn table.

Fig. 8 is a transverse sectional view taken through the parts as shown in Fig. 6.

Fig. 9 is a view in edge elevation of the automatic stop means.

Fig. 10 is a fragmentary detail view in top elevation of a portion of a stringer with the gage shown in the operative relation.

Fig. 11 is a sectional view taken on the line 11—11 of Fig. 10.

Fig. 12 is an enlarged view in transverse vertical section of the rear portion of the machine adjacent the section indicating line 4—4 of Fig. 1.

Fig. 13 is a transverse sectional view through the router with the blade shown in the adjusted relation.

Fig. 14 is a fragmentary detail view to better illustrate the adjusting notches in the adjusting bar.

Fig. 15 is a detail view of the adjusting latch.

Fig. 16 is a detail view of an adjusting clamp which might be used in place of or in conjunction with the latch as shown in Fig. 15.

Fig. 17 is a sectional view through the upper rear portion of the machine at substantially the line 4—4 of Fig. 1, but showing the parts in a modified form.

Fig. 18 is an elevational view of a portion of the structure as disclosed in Fig. 17.

The main frame comprises base members 1 and 2 which in this instance are shown as heavy planks, the side upright frame members 3 and 4 being secured on these base members 1 and 2, and the upper side frame members 5 and 6 being mounted on the upright posts 3 and 4. The end cross bars 7 and 8 are located between the upper side frame members 5 and 6, and the entire frame structure thus formed is preferably braced and reinforced in its several parts.

A bracket arm 9 is extended forwardly at the approximate longitudinal center of the side frame member 6, and is preferably disposed at right angles thereto, and this bracket member has a bearing 10 provided on the inner end thereof to have the king bolt or pin 11 fitted therethrough and through the plate 12 by which the squaring bars 13 and 14 are mounted, this passage of the king pin through the plate 12 and into the bearing 10 mounting the squaring bars 13 and 14 in such a relation that swinging adjustment of the same may be made around the king pin 11 as a pivot. These squaring bars, as is better shown in Fig. 1, are mounted by the connecting plate 12 to extend substantially at right angles with the king pin 11 as the apex of the angle, and a segment bar 15 is connected across and between the squaring bars 13 and 14 at a point adjacent the outer ends thereof, a supporting frame member 16 being carried by the frame member 5 in such a relation that the segment bar 15 will have bearing both against the frame member 16 and upon the upper side of the side frame member 5 and may have movement in a swinging path around the king pin 11, the squaring bars 13 and 14 being held in the proper spaced and angularly disposed relation by this segment bar 15.

The plate 12 in addition to mounting the squaring bars 13 and 14, is also adapted to act as the base plate of a turn table, and for this purpose the plate 12 is provided with an angular bearing track portion 17 around the center thereof, an upper turn table plate 18 being provided with a correspondingly formed angular track portion 19 to fit against and turn on the track portion 17, thus mounting the turn table plate upon the plate 12 to be held against side displacement and to be capable of turning movement. Tracks 20 and 21 are mounted on the upper turn table plate 18 at spaced apart points and extend in parallelism, a spacing member 22 being connected across between the outer ends of these track members 20 and 21 to maintain the proper spacing thereof, and these track members 20 and 21 rest at their outer ends upon the upper edge of the segmental bar 15 so that as the turn table plate 18 may be given swinging or turning adjustment upon the plate 12, the outer ends of the track members 20 and 21 will be supported and maintained in relation by their mounting upon the segmental bar 15.

A motor carriage frame 23 has the grooved guideways 24 and 25 connected at the opposite sides on the lower face thereof in a spaced apart relation to be received upon the track members 20 and 21, an electric motor 26 being mounted on the carriage 23 with the shaft extending in a vertical relation. A connecting sleeve 27 is adjustably mounted on the lower end of the motor shaft 28 and the shank 29 of the router or cutter 30 is received in a socket formed at the lower end of this sleeve 27, the set screws 31 and 32 being provided to secure the sleeve 27 in the proper adjusted relation upon the shaft 28 and to hold the shank 29 mounted rigidly in place therein. By disposing the parts in this relation, the motor carriage is mounted to have sliding movement on the track members 20 and 21 and thus the parts may be moved in such a relation that the router 30 will be carried and moved in predetermined paths, a handle 33 being connected with the motor carriage 23 on the forward side to facilitate movement thereof.

The bearing shafts 34 are connected across between the bearing frame members 35 which are mounted by the upright posts 3 and 4 of the main frame at a position adjacent the base pieces 1 and 2 of the frame, and the swinging links 36 are each pivoted at one of their ends on these bearing shafts 34 so that the free ends have swinging movement around these shafts as bearings, a connecting bar 37 being extended adjacent the free ends of these link members 36 and the bearing or shaft ends 38 of the carrying rollers 39 being received through bearings provided on the ends of the link members 36 and through the connecting bars 37 at points adjacent the ends of the links 36. It is of course to be understood that the frame parts 3 will be spaced sufficiently apart that the link bars 36 may be lowered through a swinging path occupying substantially 80° from vertical line, the parts being thus so arranged that large timbers or pieces of lumber can be placed in the machine to be operated upon.

As is shown in Figs. 2 and 5, and set forth above, the height at which the carrying rollers 39 are disposed above the base members 1 and 2 may be adjusted by swinging the link members 36 around their pivotal mountings on the bearing shafts 34, and to secure these portions in the proper adjusted relation, the ends of the connecting bars 37 are extended beyond the mounting of the shaft 38 near each end thereof and this extended end is provided with the elongated slots 40, the vertically disposed slots 41 in the end frame posts 3 and 4 to register with these slotted openings 40 and the clamp bolts 42 being provided to be received through the slots 40 and 41 so that the parts may be moved and set in the manner shown in Fig. 5 by the dotted lines, or in any other adjusted relation, thus making it possible to vary the height at which the carrying rolls 39 are disposed and when the proper setting with respect to the disposition of the router 30 has been accomplished to permit a setting of the carrying rolls against displacement from the predetermined adjustment.

The screw-threaded clamp shafts 43 and 44 are mounted on the connecting bars 37 at the forward and rear sides of the machine to extend inwardly therefrom and to be thus disposed approximately in alinement. The clamp members 45 are screwed on to the shaft 44 and lock nuts 46 are provided to be brought to a jammed relation against the screw-threaded clamp members 45 to hold the same in an adjusted relation. In the use of the machine, a stringer piece 47 or other piece of lumber is placed on the carrying rolls 39, the clamp member 45 is brought to the proper adjustment to position a piece of lumber in its disposition with respect to the pivot or king pin 11, and the screwed clamp members 48 are then turned along the shaft 43 to clamp against the forward edge of the stringer or other piece of lumber to act with the clamping member 45 to secure the piece of lumber in the proper relation upon the carrying rollers 39. By arranging the parts for supporting the lumber, in the manner set forth, the clamp members 45 may be adjusted to the proper relation and then this adjustment set through the medium of the lock or jamb nuts 46, the clamp members may be brought to a position to secure the stringer 47 in a position for one cut or several cuts therethrough and then cuts may be made farther along the length of the stringer on either side of the initial cut by loosening the clamp members 48, moving the stringer to the desired relation and then tightening the clamp members 48 to again bring the stringer to engagement against the clamp members 45, and in this way the same predetermined depth of cut from the forward edge may be accomplished.

The segmental bar 15 has a series of notches, designated as 49, 50, and 51, in Fig. 14, at one end thereof adjacent the squaring bar 14, and similar notches are formed in the upper edge of the segmental bar 15 at its opposite end and adjacent the squaring bar 13. A handle 52 is connected with the upper turn table plate 18 and thus by grasping and actuating this handle 52, the turn table plate 18 will be turned on the mounting plate 12 to adjust the track members 20 and 21 to a relation that either the squaring bar 13 or the bar 14 may be adjacent thereto. A latch member 54 is carried by the track member 20 in such a relation that as the handle 52 is moved to swing the track members, this latch will engage in the notches provided adjacent the squaring bars and thus the parts will be held against displacement from this adjusted relation. It is preferable that the bar 15 be marked off to indicate degrees of the arc of the circle on which the segmental bar is formed, and while the latch member 54 will act to hold the track members 20 and 21 in positions substantially at right angles, this latch member could hardly be used to accomplish setting at any desired degree marking, and for this purpose I provide the clamp 53 which is carried by the track member 21 to have its jaw fitted over the upper edge of the segmental bar 15 and with the clamp screw arranged to tighten against the bar so that as this clamp screw is turned into the clamping relation the clamp will be fitted against the segmental bar and will hold the adjustment of the track members 20 and 21 as made in accordance with the scale. Under some circumstances it might also be found desirable to provide inch or other graduations upon the track members 20 and 21, and this provision will do away with the necessity of measuring the cut as the same may be taken and will also allow setting of the router 30 so that by releasing the latch member 54 and the clamp member 53, the tracks 20 and 21 may be swung around their pivotal mounting and thus a cut may be formed through any part of a circle up to 180°, the markings on the track permitting the setting of the parts to the desired radius and the degree markings on the segmental bar 15 allowing the length of the cut in degrees to be determined without the use of a scale or measuring device of any sort.

For cutting the rabbets for the treads and risers in stair stringers, it is preferable that some means be provided to permit setting of the risers in a predetermined adjusted relation for each successive cut of a pair of treads and riser rabbets, and for this purpose the rear top bar 6 is provided with the elongated slots 55 and 56, the link adjusting members 57 and 58 being mounted in these slots through the medium of the clamp bolts 59 and 60. The free ends of the adjusting gage members 58 and 59 are provided with the elongated slots 61 and 62, and it is preferable that the link members be given a slight incline downwardly from the mounting on the side member 6, as is better shown in Fig. 11, and that one of the link members be fitted below the end of the remaining members. A gage lock 63 is provided with the slotted opening 64 and in the setting of the adjusting gage, this gage member 63 is positioned beneath one of the link members 57 and 58 and the clamp bolt 65 is passed through the slotted opening thereof and through the slots 61 and 62 to secure the parts in the desired setting, a second clamping bolt 66 being provided to give a more rigid setting to the gage member 63 by being passed through the slots 62 and 64 at a point spaced from the mounting of the clamp bolt 65.

It is preferable that the knives 67 of the router 30 be held in place by screws or bolts 68 and thus the blades may be changed to vary the contour of the cut, or by providing the blades 67 with slots after the usual manner of forming such blades, these blades may be made adjustable and may be held in their proper adjusted relations by the clamp bolts 68, this mounting of the blades to be detached from the head of the router providing a structure which not only permits the contour or cross sectional shape of the rabbet to be made, but at the same time, allows adjustment of the parts to regulate the width of the groove or rabbet which is cut. It is preferable that the latch members 53 and 54 be made somewhat after the manner shown in Fig. 15, where they are pivoted to the track members 21 and 20 and are shaped to swing by gravity against the upper edge of the actuated bar 15 and to thus fall by gravity into the notches provided at the ends of the same, the handles 69 and 70 being provided to permit more ready actuation of the latch members from the operative position.

The trackways 24 and 25 by which the motor carriage 23 is mounted, are extended or turned up on their forward ends to provide the extension ways 71 and 72, and by arranging the parts in this manner, when it is desired to change or make any adjustment in the blades of the router 30, the operator may by grasping the handle 33 turn or swing this motor carriage and consequently the motor to a raised position in which the parts will be supported on the extensions 71 and 72 and in this relation the end of the shaft together with the sleeve 27 and the router 30 will be in such a relation that the desired adjustment may be made. To permit this swinging up of the carriage 23, both the mounting plate 12 and the turn table plate 18 are slotted or cut away at the forward sides and thus when the tracks 20 and 21 are swung to the position shown in Fig. 1, the cutter blades and the other parts will be presented in a position directly in front of the operator where they will be readily accessible.

Stops 73 and 74 are mounted on the ends of the track members 20 and 21 and may have sliding movement thereon, the set screws 75 being provided to fix these stops in a predetermined adjusted relation so that as the carriage 23 is given movement inwardly over the tracks 20 and 21 to a point to cut the rabbet of the proper length, these stops 73 and 74 will be engaged by the carriage to prevent further inward movement thereof and in this way the length of the cut may be regulated. In using the machine to rabbet the stringers for stairs, it is desirable that the rabbet or groove for the tread be cut to extend past the rabbets for the risers so that the nose of the tread may be accommodated, and further it is desirable that the machine be so constructed and arranged that the tread rabbet may be cut with the machine moving inwardly while the riser rabbet is cut with the carriage machine drawn outwardly, and for this purpose it is desirable that a stop means be provided in addition to the stops 73 and 74 and so arranged that when the carriage 23 has been withdrawn from the inner end for the rabbet cut for the tread to the point where the riser rabbet will have communication therewith, the carriage will be stopped and adjustment can be made of the track members to set the parts for the outward cut to form the riser rabbet. Referring now more particularly to Figs. 6 to 9 inclusive, the track 20 has a notch or groove 76 formed on the outer side thereof, and a latch member 77 is carried by a pivot pin 78 in such a relation that one end thereof may swing into this notch or cut out opening 76, a spring 79 being positioned between the free ends of this latch member 77 and a bracket 80 mounted on the carriage 23, which spring will normally hold the latch member 77 swung to a position of engagement with the side of the track 20 and in such a relation that as the carriage passes that portion of the track which is notched, the latch portion will engage in this notch and stop further movement of the carriage in either direction. A latch tripping lever 81 is pivotally mounted at 82 on the carriage 23 and the inner end thereof is cut diagonally across as at 83 to provide a bearing portion to fit against the diagonally cut shape 84 of the free end of the latch member 77, the parts being thus so arranged that as the outer end of the lever 81 is grasped and swung toward the operator, the cam faces 83 and 84 will be engaged and in consequence, the latch member 77 will be swung around its pivotal mounting at 78 to such a relation that the latch end is beyond the outer face of the track member 20 and in consequence, this latch member is held in a released relation against the tension of the spring 79.

The operation of the machine for a right angled cut stair is as follows:—

By moving the carriage 23 to a relation that the same is supported on the extensions 71 and 72, fit the router in place on the motor shaft and adjust the blades to cut the groove or rabbet to have the desired contour and width. The stringer piece 47 is placed on the carrying rollers 39 and the clamp members 45 are turned along the threaded shaft 44 to a position that the stringer is held in such a relation that the inner section of the rabbets for the thread and risers is at a point where the carriage will be stopped by the latch means engaging with the opening or notch 76, the lock nuts 46 are then screwed up against the clamping members 45 and thus the adjustment of these members is set so that the stringer 47 may be moved longitudinally over the carrying rolls 39 and the same adjustment will be maintained throughout its entire length. The clamp members 48 are now screwed up against the forward edge of the stringer piece 47 and through the medium of the clamp bolts 42, the carrying rollers 39 are adjusted and secured in the proper relation to elevate the piece of lumber to a position that the router will sink the groove or router to the proper depth therein.

The angle to which the threads are to be cut to the forward edge of the stringer piece is taken with an ordinary carpenter's bevel and by placing the same against the forward edge of the top frame member 6, the squaring bar 14 is adjusted to be parallel with this angle, the nut on the king pin or bolt 11 having first been loosened. As the parts are moved to obtain the proper adjustment of the squaring bar 14, the squaring bar 13 will in consequence be carried therewith and tightening of the nut onto the king pin or bolt 11 will clamp the mounting plate 12 in a relation to hold this adjustment of the parts. If desired, additional fastening of the parts may be accomplished by clamping the squaring bars 13 and 14 to the forward top frame member 5 by the use of ordinary screw clamps, or any other approved form of fastening or clamping means may be employed.

The carriage 23, it will be understood, has been previously moved to a position on the outer ends of the track members 20 and 21, and by grasping the handle 52 and exerting a pulling pressure upon the same, the tracks will be swung with the carriage 23 and the turn table plate 18 to a relation that the latch 53 may be engaged in the central notch 50 adjacent the squaring bar 14, this adjustment holding the track members in such a relation that as the carriage 23 is moved along the length thereof the movement will be parallel with the line of extent of the squaring bar 14. The handle 81 is grasped and turned to release the latch member 77 from its operative position and through the medium of the handle 33, the carriage 23 is given inward movement in a relation that the blades of the router 30 cut a groove or rabbet across the stringer piece from the forward edge, and this movement may be continued until the stops 73 and 74 are encountered. As the carriage strikes these stops mounted on the track members 20 and 21, the handle 81 may be released and the carriage 23 23 withdrawn to the point where the latch member 77 engages in the notch 76 and stops further return movement of the carriage. The latch member 53 is then raised from its engaged position with the central notch 50 and through the medium of the handle 52, the turn table member 18 is shifted to swing the track members 21 and 20 to relation where they are parallel with the squaring bar 13, the latch member 54 being engaged in the central notch of the arcuated bar 15 adjacent the squaring bar 13. The handle 81 is then again grasped and pressure is exerted thereon to remove the latch member 77 from the operative engagement in the notch 76 and the carriage 23 may then be withdrawn back over the track members 20 and 21 and in this path of movement, will cut the rabbets or grooves for the star risers. When the desired rabbets for a single pair of tread and riser members have been cut, the clamp members 48 will be released from their position of engagement on the forward edge of the stringer piece 47 and this piece will be adjusted over the carrying rollers to a position where the next adjacent set of rabbets or grooves is to be cut, it of course being understood that the setting of the members 45 and of the carrying rollers 39 is maintained.

When the proper adjustment for a second set of rabbets has been obtained, the gage member 63 may be fitted in the rabbets for the risers and by adjusting the clamp bolts 65 and 66 in the manner hereinbefore set forth, a gage will be provided which will upon each successive cut insure that the parts are positioned and maintained in an identical relation. As is shown in Fig. 1, it is preferable that the adjusting gage means be provided on each side of the mounting of the squaring structure so that the machine is adaptable for first cutting the rabbets on the stringer for one side of the stairway and then with the parts set in the same relation for cutting the rabbets in the stringer on the opposite side.

In some instances it may be desired to taper the rabbets on the inner sides as is shown by the dotted lines of Fig. 10 to adapt the same to receive wedge blocks, and it is for this purpose that notches 49, 50 and 51 are provided at each side of the squaring frame. As has been hereinbefore set forth, when the straight cut at right angles is to be obtained, the latch member 54 will be fitted in the central notch or groove and in this setting and adjustment of the parts the tracks 20 and 21 will be so disposed that the movement of the carriage 23 will be in both cutting operations in a line parallel with the extent of the squaring bars 13 and 14. Now, by shifting the turn table plate 18 slightly with the latch member 53 raised out of the notch 50, the track will be given a slight angular setting from the right angle or from the main cut which has been formed in the stringer. The latch 53 may be then engaged in the notch 49 and the carriage again moved inwardly over the tracks 20 and 21, which movement will cause the inner sides of the rabbets to be cut away in the tapered formation shown in Fig. 10 by the dotted lines. In setting the parts to cut the rabbets for the risers to have the tapers, the latch member 54 will be positioned in the inner notch adjacent the squaring bar 13, and of course it will be understood that should it be desired to taper the rabbets or grooves to the outside of the cut, this may be accomplished by adjusting the latch members 53 or 54 into the outer notch.

If desired, the squaring bars 13 and 14 might be arranged upon a turn table structure such as is shown in Figs. 17 and 18, and then by bringing the motor carriage frame 23 to its innermost position, the router would be disposed substantially at the axis of this turn table so that as the squaring bars might be shifted to one side or the other, the router would remain at substantially a fixed point and thus it would not be necessary to withdraw the motor carriage frame during the resetting operation and further it will be possible to start a second cut from the end of a cut which has already been formed in the lumber. With the above in mind, the bracket arm 9′, which is extended to be attached and secured at the same mounting as is shown for the bracket arm 9 in the preferred embodiment of the structure, has the free end thereof widened out to form the turn table base 90 which has a track way 91 formed in the upper face thereof and is also provided with the substantially T-shaped groove 92. The squaring bars are connected with a plate 12′ and a turning member 93 is secured to this plate 12′ and is provided with the downwardly extending annular rim 94 which is shaped to be received and to have a turning fit in the track way 91 of the base portion 90. A headed bolt 95 is passed through an opening provided in the member 93 and the plate 12′ and has its head fitted in the T-shaped groove 92, a clamp nut 96 being mounted on the upper screw-threaded end of this clamp bolt 95 so that as the desired setting of the squaring bars is accomplished the nut 96 may be tightened upon the bolt 95 and through the fact that the head thereof is fitted in the T-shaped groove 92, the plate 12′ and consequently the securing bars will be held in the desired adjusted position. To permit setting of the squaring bars to predetermined positions, the indicator pointer 97 is formed on the member 93 and the turn table base 90 is graduated as indicated at 98 to show degrees and fraction of degrees on each side of a center taken through the bracket arm 9′, it being preferable that these indicating markings be run up to 45° or more on each side of this center line.

From the foregoing description and from the drawings it will be seen that I have provided a machine which is constructed for the special purpose of housing or cutting out grooves or rabbets to allow fitting of treads and risers in stringers or in newel posts in stair building, which may be used for inlaying, dadoing, fret work, dove-tailing, or which may be used in any other connection where a groove or rabbet is to be cut in a predetermined angular relation across a piece of lumber or is to be cut to take the arc of a circle, and by placing the degree markings and the inch and fractional measurements as has been hereinbefore described, these cuts may be made in timbers, posts, or other pieces of lumber, with greatest accuracy and with facility it not being necessary to make calculations or to make special measurements to determine the proper setting of the machine and to accomplish the desired cut.

While I have herein shown and described only specific forms of the invention, it will of course be understood that some other form of motor power, rather than an electric motor might be used, that the blades of the router might be arranged in a different mounting or might be made integral with the head thereof, that the shape of the blades might be varied to accomplish the sinking of a dove-tailed cut or to otherwise vary the contour of the cut, and that a number of other modifications and changes in the arrangement and combinations of the parts may be resorted to without departing from the spirit and scope of my invention, and hence, I do not wish to be limited to the exact disclosure but only to such points as may be set forth in the claims.

I claim:—

1. A woodworking machine comprising a supporting frame, tracks carried by said frame in an adjustable mounting, a carrier supported on said tracks to be capable of movement thereon, a rotary cutter supported from said carrier, adjustable carrier means mounted on the supporting frame to receive the lumber to be acted upon and to be adjustable to regulate the disposition of the same with respect to the cutter to thus vary the depth of cut, stop means to regulate the extent to which the grooves are cut into the lumber, and a second stop means to halt the return movement of the carriage in a predetermined relation to allow a second cut to be made from the first cut at a predetermined point therefrom and in an angular disposition.

2. A woodworking machine comprising a supporting frame, carrying means by which a piece of lumber is mounted and held in a predetermined relation, squaring bars connected together in angular disposition and provided with an arcuated bar connecting the free ends thereof and provided with notches, tracks mounted on the structure formed by the squaring bars to be capable of swinging movement upon the arcuated bar, a carriage mounted on said tracks to be capable of movement longitudinally thereof, a cutter supported from said carriage, and means to hold said tracks in the desired adjusted relation by engagement in the notches of the arcuated bar.

3. A woodworking machine comprising a supporting frame, carrying means by which a piece of lumber is mounted and held in a predetermined relation, squaring bars connected together in angular disposition and provided with an arcuated bar connecting the free ends thereof and provided with notches, tracks mounted on the structure formed by the squaring bars to be capable of swinging movement upon the arcuated bar, a carriage mounted on said tracks to be capable of movement longitudinally thereof, a cutter supported from said carriage, means to hold said tracks in the desired adjusted position by engagement in the notches of the arcuated bar, and stop means by which the travel of the carriage along the track is limited.

4. A woodworking machine comprising a supporting frame, means to carry and mount a piece of lumber in a relation to be operated upon, squaring bars connected together to extend angularly one from the other, an arcuated bar connected across the free ends of said squaring bars and provided with notches on the upper edge adjacent the connection with said bars, a king pin around which the squaring bars have swinging movement, means by which the swinging movement of the bars is stopped and the same are held in a predetermined angular adjustment, a pair of tracks mounted on said squaring bars to be capable of swinging movement adjacent the arcuated bar, means to be received in the notches of said arcuated bar to hold the said tracks in a predetermined angular adjustment, a carriage mounted to have sliding movement on said tracks, and a cutter supported from said carriage to be brought to a cutting relation as the carriage is moved along the tracks.

5. A woodworking machine comprising a supporting frame, means to carry and mount a piece of lumber in a relation to be operated upon, squaring bars connected together to extend angularly one from the other, an arcuated bar connected across the free ends of said squaring bars and provided with notches on the upper edge adjacent the connection with said bars, a king pin around which the squaring bars have swinging movement, means by which the swinging movement of the bars is stopped and the same are held in a predetermined angular adjustment, a pair of tracks mounted on said squaring bars to be capable of swinging movement adjacent the arcuated bar, means to be received in the notches of said arcuated bar to hold the said tracks in a predetermined angular adjustment, a carriage mounted to have sliding movement on said tracks, a cutter supported from said carriage to be brought into a cutting relation as the carriage is moved along the tracks, stop means carried by said tracks to limit the movement of the carriage, and an adjustment provided in the carrier means by which the piece of lumber is held to permit the proximity of said piece to the cutter to be adjusted to regulate the depth of cut.

6. A wood working machine comprising a supporting frame, means mounted on said frame by which the piece of lumber to be operated upon is carried and supported in the desired relation, a turn table base member, a second turn table member mounted on said first member to be capable of turning movement, a pair of tracks carried by said second member in a spaced apart relation, an arcuated bar positioned adjacent the swinging end of said tracks, a carriage mounted to be capable of sliding movement endwise of said tracks, means by which the tracks are held in a predetermined angular adjustment with respect to the arcuated bar, a cutter supported from said carriage to be moved in a cutting path as the carriage is shoved along the track, a stop to limit forward movement of the carriage, a second stop to automatically engage as the carriage is withdrawn to a predetermined point to hold the same against further return movement, the tracks being so mounted with respect to the arcuated bars that a second adjustment of the same may be made when the cutter carrying carriage has been thus stopped, and means by which said second stop means may be disengaged to permit the withdrawal of the carriage backwardly along the length of the tracks in a new cutting path.

7. A woodworking machine comprising a supporting frame, means mounted on said frame by which the piece of lumber to be operated upon is carried and supported in the desired relation, a turn table base member, a second turn table member mounted on said first member to be capable of turning movement, a pair of tracks carried by said second member in a spaced apart relation, an arcuated bar positioned adjacent the swinging end of said tracks, a carriage mounted to be capable of sliding movement endwise of said tracks, means by which the tracks are held in a predetermined angular adjustment with respect to the arcuated bar, a cutter supported from said carriage to be moved in a cutting path as the carriage is shoved along the track, a stop to limit forward movement of the carriage, a second stop to automatically engage as the carriage is withdrawn to a predetermined point to hold the same against further return movement, the tracks being so mounted with respect to the arcuated bar that a second adjustment of the same may be made when the cutter carrying carriage has been thus stopped, means by which said second stop means may be disengaged to permit the withdrawal of the carriage backwardly along the length of the tracks in a new cutting path, and adjustable means formed as a part of the lumber supporting means to permit variation in the relative positioning of the lumber with respect to the cutter to thus regulate the depth to which the cut is formed.

8. A woodworking machine comprising a supporting frame, a pair of squaring bars connected together in angular disposition and pivotally mounted on their frame at their angle, an arcuated bar connected between the free ends of said squaring bars and provided with notches on the upper end thereof adjacent each of the bars, a turn table track formed on a part of the mounting of said squaring bars, a turn table plate mounted on said track to be capable of turning movement, a pair of tracks mounted on said second turn table member to have swinging movement as said member is turned, means by which the squaring frame structure may be set and clamped in an adjusted relation, a carriage mounted on said track, a cutter supported from said carriage, and latch means to be engaged in the notches at each end of the arcuated bar as the tracks are swung to the one side or the other to hold these tracks in a relation that grooves cut from each of the adjusted positions will be disposed in predetermined angular relations.

9. A woodworking machine comprising a supporting frame, a pair of squaring bars connected together in angular disposition and pivotally mounted on the frame at their angle, an arcuated bar connected between the free ends of said squaring bars and provided with notches on the upper edge thereof adjacent each of the bars, a turn table track formed on a part of the mounting of said squaring bars, a turn table plate mounted on said track to be capable of turning movement, a pair of tracks mounted on said second turn table member to have swinging movement as said member is turned, means by which the squaring frame structure will be set and clamped in an adjusted relation, a carriage mounted on said track, a cutter supported from said carriage, latch means to be engaged in the notches at each end of the arcuated bar as the tracks are swung to one side or the other to hold these tracks in a relation that grooves cut from each of the adjusted positions will be disposed in predetermined angular relations, carrying means by which the piece of lumber to be operated upon is held in a predetermined relation with respect to the cutter, and means to be adjusted to vary the lateral disposition of the piece of lumber and to clamp the same in the desired position to be operated.

10. A woodworking machine comprising a supporting frame, a pair of squaring bars connected together in angular disposition and pivotally mounted on the frame at their angle, an arcuated bar connected between the free ends of said squaring bars and provided with notches on the upper edge thereof adjacent each of the bars, a turn table track formed on a part of the mounting of said squaring bars, a turn table plate mounted on said track to be capable of turning movement, a pair of tracks mounted on said turn table member to have swinging movement as said member is turned, means by which the squaring frame structure may be set and clamped in adjusted relation, a carrier mounted on said track, a cutter supported from said carrier, latch means to be engaged in the notches at each end of the arcuated bar as the tracks are swung to the one side or the other to hold these tracks in a relation that grooves cut from each of the adjusted positions will be disposed in predetermined angular relation, carrying means by which the piece of lumber to be operated upon is held in a predetermined relation with respect to the cutter, means to be adjusted to vary the lateral disposition of the piece of lumber and to clamp the same in the desired position to be operated upon, stops carried by said tracks to limit forward movement of the carriage, stop means mounted on the carriage to become active as the carriage is moved in the return path to hold the same in a predetermined position to allow adjustment of the tracks to a varied angular disposition, and means to release said second stop means to permit the withdrawal of the carriage to direct the cutter in a new cutting path.

11. A wood working machine comprising a supporting frame, a pair of squaring bars connected together in angular disposition and pivotally mounted on the frame at their angle, an arcuated bar connected between the free ends of said squaring bars and provided with notches on the upper edge thereof adjacent each of the bars, a turn table track formed on a part of the mounting of said squaring bars, a turn table plate mounted on said track to be capable of turning movement, a pair of tracks mounted on said second turntable member to have swinging movement as said member is turned, means by which the squaring frame structure may be set and clamped in an adjusted relation, a carriage mounted on said tracks, a cutter supported from said carriage, latch means to be engaged in the notches at each end of the arcuated bar as the tracks are swung to the one side or the other to hold these tracks in a relation that grooves cut from each of the adjusted positions will be disposed in a predetermined angular relation, carrying means by which the piece of lumber to be operated upon is held in a predetermined relation with respect to the cutter, means to be adjusted to vary the lateral disposition of the piece of lumber and to clamp the same in the desired position to be operated upon, stops carried by said track to limit forward movement of the carriage, stop means mounted on the carriage to become operative as the carriage is moved in the return path to hold the same in a predetermined position to allow adjustment of the tracks to a varied angular disposition, means to release second stop means to permit the withdrawal of the carriage to direct the cutter in a new cutting path, and adjustable gage means by which any desired number of grooves may be cut along the length of the piece of lumber at predetermined spacing.

In testimony whereof I affix my signature in presence of two witnesses.

ALFRED B. DAUGER.

Witnesses:
WM. MURCELL,
C. K. ALDRICH.

Copies of this patent may be obtained for five cents each, by addressing the "Commissioner of Patents, Washington, D. C."